(12) United States Patent
Bohner et al.

(10) Patent No.: US 6,367,575 B1
(45) Date of Patent: *Apr. 9, 2002

(54) MOTOR VEHICLE STEERING SYSTEM

(75) Inventors: Hubert Bohner, Böblingen; Martin Moser, Fellbach, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,313

(22) Filed: Feb. 3, 1997

(30) Foreign Application Priority Data

Feb. 1, 1996 (DE) .......................... 196 03 568

(51) Int. Cl.$^7$ .............................. B62D 5/04; B62D 5/06; B62D 5/30
(52) U.S. Cl. ..................... 180/403; 180/406; 180/407; 180/417; 180/443; 280/773
(58) Field of Search ................................ 180/403, 402, 180/406, 416, 434, 404, 407, 405, 444, 443, 445, 446, 427, 417; 280/773, 90, 89, 11

(56) References Cited

U.S. PATENT DOCUMENTS

| | | | | |
|---|---|---|---|---|
| 3,202,238 A | * | 8/1965 | Strader | |
| 3,692,138 A | * | 9/1972 | Witt | |
| 4,160,490 A | * | 7/1979 | Bexten et al. | 60/405 |
| 4,558,759 A | * | 12/1985 | Baatrup et al. | 180/132 |
| 4,723,475 A | | 2/1988 | Burk | 91/434 |
| 5,022,482 A | * | 6/1991 | Andersson et al. | 60/418 |
| 5,347,458 A | * | 9/1994 | Serizawa et al. | |
| 5,845,736 A | * | 12/1998 | Bohner et al. | |
| 5,862,878 A | * | 1/1999 | Bohner et al. | |

FOREIGN PATENT DOCUMENTS

| | | |
|---|---|---|
| DE | 2 261 144 | 11/1972 |
| DE | 37 14 833 A1 | 11/1987 |
| DE | 41 33 726 A1 | 4/1992 |
| FR | 2040906 | 1/1991 |
| GB | 977193 | 12/1964 |
| GB | 1100689 | 1/1968 |
| WO | WO 92/06880 | 4/1992 |

* cited by examiner

*Primary Examiner*—Anne Marie Boehler
(74) *Attorney, Agent, or Firm*—Crowell & Moring LLP

(57) ABSTRACT

A steering system for motor vehicles, in which a steering member or steering wheel and the steered vehicle wheels are hydraulically positively coupled for the steering actuation of the wheels. An additional servo system is provided which is responsive to torque transmitted between the steering wheel and master unit of the hydraulic system.

10 Claims, 2 Drawing Sheets

MOTOR VEHICLE STEERING SYSTEM

BACKGROUND OF SUMMARY OF THE INVENTION

The invention relates to a steering system for motor vehicles with a steering member, in particular a steering wheel, which is driver actuated and is hydraulically positively coupled to steered vehicle wheels. A hydrostatic master unit, which is mechanically drive-connected to the steering member, and a hydrostatic slave unit, which mechanically drive-connected to steered vehicle wheels, are drive-connected to one another via hydraulic lines. A servo system can be controlled as a function of the forces and torques transmitted between the steering member and the master unit.

A known steering system of the aforementioned type is described in DE 41 33 726 A1. In current motor vehicle steering systems, however the steering wheel is mechanically positively coupled to the steered vehicle wheels via a so-called steering column, which requires considerable amount of installation space. Moreover, comparatively complex designs are required in order to reliably avoid a situation, in the case of motor vehicle accidents, where the steering column can push the steering wheel into the vehicle interior against the driver. A further difficulty is that comparatively extensive design modifications are required if a motor vehicle is to be produced with both left-hand and right-hand steering.

The hydraulic drive connection between the steering wheel and the steered vehicle wheels in accordance with DE 41 33 726 A1 eliminates the need for the accommodation of the steering column. The hydraulic lines provided instead can be accommodated in virtually any desired manner.

Despite these apparent advantages, it has not hitherto been possible for steering systems of the type described in above-mentioned DE 41 33 726 A1 to be used in motor vehicles because of lack of legal approval. Doubts about safety are probably the primary reason for this.

Another conventional steering system is described in German Offenlegungsschrift 2,261,144 in which the servo system is integrated into the hydraulic positive coupling.

GB-A 977 193 discloses only a steering system with a hydraulic drive connection between the steering wheel and steered vehicle wheels without a servo unit.

DE 37 14 833 A1 relates to a servo steering system with a mechanical drive connection between the steering wheel and steered vehicle wheels and two servo systems arranged in parallel. If a normally active hydraulic servo valve becomes inoperative, an electric servo motor can come into action.

It is, therefore, an object of the present invention to ensure particularly high reliability in a steering system.

According to the present invention, this object has been achieved by loading the master unit into a central position by springs.

The present invention is based on the recognition that, when the master unit is adjusted by the steering member, a manual force of greater or lesser magnitude must be overcome and is provided by virtually indestructible and fail-safe springs. By controlling the servo system, which is independent of the hydraulic drive connection between the steering member and the steered vehicle wheels, as a function of the forces acting between the steering member and the master unit, a servo force suitable for the actuation of the steered vehicle wheels can be produced and controlled even if the hydraulic drive connection fails completely due to leakage.

Given a functional hydraulic drive transmission, the servo system of the present invention thus serves to increase comfort, while, if the hydraulic drive transmission is interrupted, maintaining the steerability of the vehicle.

The hydraulic connecting lines can be dimensioned so as to have a restrictor effect or can be fitted with throttle valves in order to achieve the action of a steering damper without further measures According to a particularly preferred embodiment, the hydraulic system can be held continuously under a hydraulic preload. On one hand, complete freedom from play is ensured. On the other hand, the system can be monitored for any pressure drop. A warning signal can be generated as soon as the hydraulic excess pressure drops below a threshold at which reliable operation of the steering is assured for a considerable time to come.

DETAILED DESCRIPTION OF THE DRAWINGS

Figure 1:
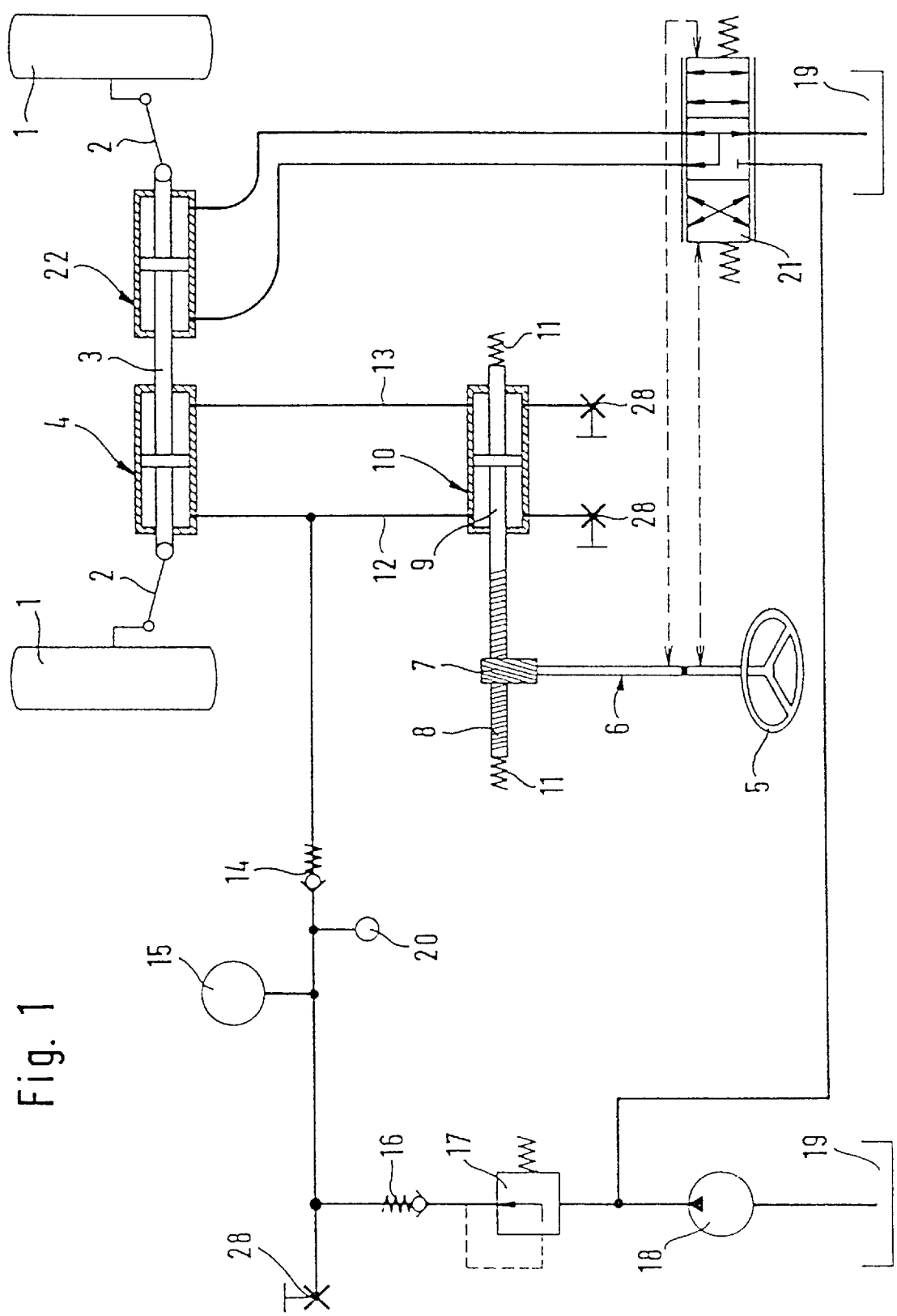
FIG. 1 is a schematic circuit diagram of a first embodiment of the vehicle steering system according to the present invention with or without hydraulic servo assistance.

Referring now to FIG. 1, a motor vehicle has steered vehicle wheels 1 which are connected in a fundamentally conventional manner to the piston rod 3 of a double-acting piston/cylinder unit 4 via track rods 2 or the like. Therely, when the piston rod 3 is displaced out of the illustrated straight-ahead position, the steered vehicle wheels 1 are steered to the right or left, or steering movements of the steered vehicle wheels 1 lead to a displacement of the piston rod 3.

A steering wheel 5 is drivingly connected, via a shaft 6, to a pinion 7 which meshes with a rack 8. The rack 8 is connected (preferably integrally) to the piston rod 9 of another piston/cylinder unit 10. Thereby, when the steering wheel 5 is turned, the piston rod 9 must necessarily be displaced in one direction or the other direction, or conversely displacements of the piston rod 9 lead to a corresponding rotation of the steering wheel 5. The rack 8 and the piston rod 9 are loaded into the illustrated central position by helical compression springs 11.

Each side of piston/cylinder unit 10 is hydraulically connected to one side of piston/cylinder unit 4 by a respective line 12 or 13, such that the steered vehicle wheels 1 are steered to the right when the steering wheel 5 is turned to the right and are steered in the opposite direction when the steering wheel 5 is turned to the left.

Line 12 is connected via a nonreturn valve 14, which only, permits flow in the direction of line 12, to an accumulator 15, which is connected via another nonreturn valve 16, which only permits flow in the direction of the accumulator 15 and opens only at an inlet-side excess pressure of about 5 bar, and to a pressure-limiting valve 17, which is arranged upstream of nonreturn valve 16 and closes at a pressure of about 10 bar on its outlet side, to the delivery side of a hydraulic pump 18 (or some other pressure source). The inlet side of the pump 18 is connected to a hydraulic reservoir 19. The accumulator 15 is assigned a pressure switch 20 which generates a warning signal as soon as the pressure drops below a predetermined threshold, for example the opening pressure of nonreturn valve 16.

When the steering wheel 5 is actuated, the piston rod 9 of piston/cylinder unit 10 is displaced. As a result, the piston rod 3 of piston/cylinder unit 4 is also displaced in a corresponding manner and the steered vehicle wheels 1 are deflected in one direction or the other depending on the direction of turning of the steering wheel 5. The transmission of drive between steering wheel 5 and steered vehicle wheels 1 is virtually play-free because the hydraulic drive connection between the piston/cylinder units 4, 10 is under excess pressure. If a leak occurs on one side of the piston/cylinder units 4, 10, the accumulator 15 supplies an appropriate additional quantity of hydraulic medium. The accumulator 15 is replenished sooner or later, or the pressure switch 20 responds and generates a warning signal.

If required, the hydraulic pump 18 can also serve to supply a hydraulic servo system, which may be of fundamentally conventional configuration.

A servo motor 22 drive-connected to the piston rod 3 is subjected to a larger or smaller pressure difference via a servo valve 21 controlled as a function of the manual forces which can be sensed at the steering wheel 5. As illustrated, the servo motor 22 can be configured as a piston/cylinder unit having a piston rod formed by the piston rod 3 of piston/cylinder unit 4. To control the servo valve 21, the shaft 6 is divided into two parts, which can be rotated to a limited extent relative to one another and are drive-connected to one another by a spring system, for example a torsion bar which attempts to hold the two parts of the shaft in a central position relative to one another.

Accordingly, the parts of the shaft 6 perform a rotation of greater or lesser magnitude relative to one another during steering manoeuvres. This rotation depends on the forces transmitted between steering wheel 5 and pinion 7. This relative rotation controls the servo valve 21, with the result that the servo motor 22 generates a greater or lesser servo force to assist the respective steering manoeuvre. The end result is that the manual force to be applied to the steering wheel 5 is reduced to a more or less marked extent.

The servo system illustrated can operate as an emergency steering system if the hydraulic drive connection between the piston/cylinder units 4, 10 fails completely due to a leak.

Even if the two piston/cylinder units 4, 10 are completely decoupled from one another due to a leak, the steering wheel 5 can be turned merely by a manual force predetermined by the helical compression springs 11. That is, owing to the springs 11, there is always a torque of greater or lesser magnitude acting between the steering wheel 5 and the pinion 7. This torque leads to a relative rotation between the parts of the shaft 6 and hence to an appropriate displacement of the servo valve 21. This, in turn, has the effect that the servo motor 22 is subjected to a corresponding hydraulic pressure difference and exerts a corresponding actuating force on the steered vehicle wheels 1.

Figure 2:
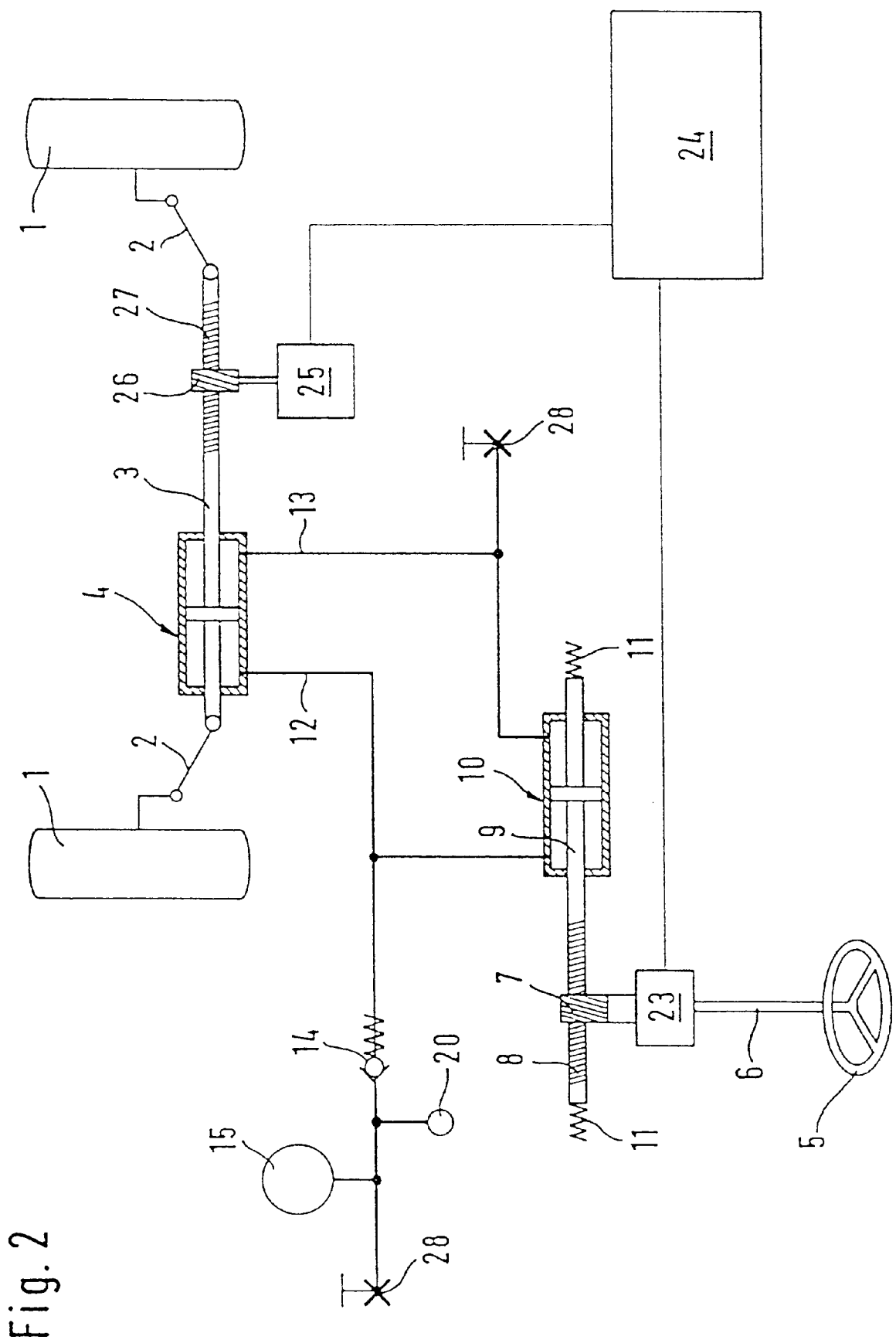
FIG. 2 is a schematic diagram of a another embodiment of the present invention with electric servo assistance.

The other embodiment illustrated in FIG. 2 differs from the embodiment shown in FIG. 1 in particular in that an electric servo system is provided. In particular, a torque sensor 23 is arranged between the shaft 6 and the pinion 7. The torque sensor signals represent the magnitude and direction of the torque which acts in each case between shaft 6 and pinion 7 and are fed to a control unit 24. As a function of these signals, the control unit 24 controls an electric motor 25 free from self-locking which is drive-connected to a rack 27, arranged or formed on the piston rod 3, via a pinion 26 driven by the motor 25. As a function of the torque recorded by the torque sensor 23 and transmitted between the steering wheel and the pinion 7, the electric motor 25 is controlled by the control unit 24 so that it generates a greater or lesser servo force to assist the respective steering manoeuvre.

This electric servo system can likewise operate as an emergency steering system if the hydraulic drive connection between the piston/cylinder units 4, 10 fails completely due to a leak. If, in the event of such a leak, the two piston/cylinder units 4, 10 are completely decoupled from one another, the steering wheel 5 can once again be turned merely by a manual force predetermined by the helical compression springs 11. That is, owing to the springs 11, the torque sensor 23 signals a torque in one direction or the other which increases with increasing deflection of the rack 8 out of the illustrated central position. Thereby, the control unit 24 controls the electric motor 25 so as to generate a corresponding force in one direction or the other. As a result, the electric motor 25 then subjects the steered wheels 1 to a corresponding actuating force, i.e. the steered wheels 1 follow the steering command of the steering wheel 5.

In the embodiment of FIG. 2, automatic replenishment of the accumulator 15 is not provided. However, in principle, it is just as possible to do so as with the embodiment of FIG. 1.

For inspection purposes, or during assembly, hydraulic medium can be introduced or discharged via outlet valves 28 both in the embodiments shown in FIGS. 1 and 2. In the embodiment illustrated in FIG. 1, the servo valve has what is referred to as a closed center, i.e. the delivery side of the pump 18 is shut off from the reservoir 19 in the illustrated central position of the valve 21. In principle, however a servo valve 21 with what is referred to as an open center can be used, i.e all the ports of the valve 21 are in open communication with one another in the central position of the valve.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering system for a motor vehicle, comprising a steering wheel actuated by a driver and hydraulically positively coupled to steered vehicle wheels, a hydrostatic master unit mechanically drive-connected to the steering wheel, a hydrostatic slave unit mechanically drive-connected to the steered vehicle wheels, the master and slave units being hydraulically positively coupled to one another via hydraulic lines to form a hydraulic positive coupling, and a servo system, separate from the hydraulic positive coupling, arranged to be controlled as a function of the forces or torques transmitted between the steering wheel and the master unit, wherein springs are sized and operatively arranged to load the master unit into a central position, wherein the hydraulic positive coupling is under hydraulic preloading at least one line of the hydraulic lines between the master and slave units is connected to a hydraulic accumulator via a nonreturn valve opening in the direction of the at least one line.

2. A steering system for a motor vehicle, comprising a steering wheel actuated by a driver and hydraulically positively coupled to steered vehicle wheels, a hydrostatic master unit mechanically drive-connected to the steering wheel, a hydrostatic slave unit mechanically drive-connected to the steered vehicle wheels, the master and slave units being hydraulically positively coupled to one another via hydraulic lines to form a hydraulic positive coupling, and a servo system, separate from the hydraulic positive coupling, arranged to be controlled as a function of the forces or torques transmitted between the steering wheel and the master unit, wherein springs are sized and operatively arranged to load the master unit into a central position and the servo system is an electric servo system having an electric servo motor controllable as a function of signals of a torque or force sensor which records the forces or torques transmitted between the steering wheel and the master unit.

3. A steering system for a motor vehicle, comprising steered vehicle wheels; a steering wheel actuatable by a driver; a hydrostatic master unit mechanically drive-connectable to the steering wheel; a hydrostatic slave unit mechanically drive-connectable to the steered vehicle wheels for steering said wheels; hydraulic lines configured to provide a permanently bidirectional positive hydraulic coupling of the hydrostatic master and slave units, thereby simultaneously causing a bidirectional positive hydraulic coupling of the steered vehicle wheels and the steering wheel; springs operably arranged for loading the hydrostatic master unit into a central position and thereby providing a torque between the steering wheel and the hydrostatic master unit; a servo system in addition to the positive hydraulic coupling; and means for controlling the servo system as a function of forces, inclusive of said torque, transmitted between the steering wheel and the hydrostatic master unit.

4. The steering system according to claim 3, wherein the hydrostatic master and slave units are double-acting displacer units.

5. The steering system according to claim 4 wherein the double-acting units are piston/cylinder units.

6. The steering system according to claim 3, wherein the hydraulic positive coupling is under hydraulic preloading.

7. The steering system according to claim 6, wherein a pressure switch is operatively arranged in one of the hydraulic lines to generate a warning signal with a pressure drop below a predetermined threshold.

8. The steering system according to claim 3, wherein the hydraulic lines are configured to permit inclusion of valves between the master and slave units to dampen the steering.

9. The steering system according to claim 3, wherein a hydraulic servo system is a hydraulic system having a servo valve controllable as a function of the forces or torques transmitted between the steering wheel and the master unit.

10. The steering system according to claim 3, wherein the steering wheel is configured to actuate the master unit with a pinion drive-connected to the steering wheel and a rack meshing with the pinion.

* * * * *